(12) United States Patent
Waldron et al.

(10) Patent No.: US 10,901,190 B2
(45) Date of Patent: Jan. 26, 2021

(54) HEMISPHERICAL STAR CAMERA

(71) Applicant: The Charles Stark Draper Laboratory, Inc., Cambridge, MA (US)

(72) Inventors: Erik L. Waldron, Concord, MA (US); Gregory P. Blasche, Burlington, MA (US); Paul Bohn, Brighton, MA (US); Robin Mark Adrian Dawson, Waltham, MA (US); Walter Foley, Colton, NY (US); Samuel Harrison, Acton, MA (US); Matthew T. Jamula, Brighton, MA (US); Juha-Pekka J. Laine, Boston, MA (US); Benjamin F. Lane, Grafton, MA (US); Sean McClain, Somerville, MA (US); Francis J. Rogomentich, Wilmington, MA (US); Stephen P. Smith, Acton, MA (US); John James Boyle, Bourne, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 682 days.

(21) Appl. No.: 14/746,970

(22) Filed: Jun. 23, 2015

(65) Prior Publication Data

US 2016/0381267 A1 Dec. 29, 2016

(51) Int. Cl.
*G02B 13/00* (2006.01)
*G02B 23/16* (2006.01)
(Continued)

(52) U.S. Cl.
CPC ......... *G02B 13/005* (2013.01); *G01C 21/025* (2013.01); *G02B 13/06* (2013.01);
(Continued)

(58) Field of Classification Search
CPC ...... G02B 13/005; G02B 13/06; G02B 23/16; H04N 5/2254; H04N 5/2258
See application file for complete search history.

(56) References Cited

U.S. PATENT DOCUMENTS

| 3,166,623 | A |   | 1/1965 | Waidelich, Jr. .............. 88/1 |
| 4,285,762 | A | * | 8/1981 | Moustakas ........ H01L 21/32137 |
|           |   |   |        | 136/256 |

(Continued)

FOREIGN PATENT DOCUMENTS

| JP | 2000-120288 A | 4/2000 | ............... E04H 3/10 |
| JP | 3084435 | 3/2002 | ............... E04B 7/16 |

(Continued)

OTHER PUBLICATIONS

International Searching Authority, International Search Report for International Application No. PCT/US2016/026006, together with the Written Opinion, 14 pages, dated Jun. 27, 2016.

(Continued)

*Primary Examiner* — Joseph Suh
(74) *Attorney, Agent, or Firm* — Sunstein LLP

(57) ABSTRACT

A digital camera optically couples a monocentric lens to image sensor arrays, without optical fibers, yet shields the image sensor arrays from stray light. In some digital cameras, baffles are disposed between an outer surface of a monocentric lens and each image sensor array to shield the image sensor arrays from stray light. In other such digital cameras, an opaque mask defines a set of apertures, one aperture per image sensor array, to limit the amount of stray light. Some digital cameras include both masks and baffles.

16 Claims, 15 Drawing Sheets

(51) Int. Cl.
*H04N 5/225* (2006.01)
*H04N 5/369* (2011.01)
*G02B 13/06* (2006.01)
*G01C 21/02* (2006.01)
*H04N 5/232* (2006.01)
*H04N 5/33* (2006.01)

(52) U.S. Cl.
CPC ........... *G02B 23/16* (2013.01); *H04N 5/2254* (2013.01); *H04N 5/2258* (2013.01); *H04N 5/23299* (2018.08); *H04N 5/3696* (2013.01); *H04N 5/332* (2013.01)

(56) References Cited

U.S. PATENT DOCUMENTS

| | | | |
|---|---|---|---|
| 4,331,390 A | 5/1982 | Shafer | 350/444 |
| 4,557,798 A * | 12/1985 | Blanding | B41M 3/003 |
| | | | 101/34 |
| 5,012,081 A * | 4/1991 | Jungwirth | G01S 3/7867 |
| | | | 250/203.6 |
| 5,121,251 A | 6/1992 | Edwards | 359/368 |
| 5,206,499 A * | 4/1993 | Mantravadi | G01S 3/7867 |
| | | | 250/203.6 |
| 5,680,252 A * | 10/1997 | Sitter, Jr. | G02B 5/1814 |
| | | | 359/558 |
| 5,745,869 A | 4/1998 | van Bezooijen | 701/222 |
| 6,049,171 A * | 4/2000 | Stam | B60Q 1/085 |
| | | | 250/208.1 |
| 6,144,508 A * | 11/2000 | Bransome | A61B 3/0008 |
| | | | 351/223 |
| 6,215,593 B1 | 4/2001 | Bruce | 359/619 |
| 6,429,422 B1 | 8/2002 | Bohn | 250/234 |
| 6,462,889 B1 * | 10/2002 | Jackson | G02B 5/003 |
| | | | 244/3.17 |
| 7,982,951 B1 * | 7/2011 | Innes | G02B 23/16 |
| | | | 359/429 |
| 8,248,499 B2 * | 8/2012 | Sutton | G02B 3/0037 |
| | | | 348/294 |
| 8,472,735 B2 | 6/2013 | Lane et al. | 382/235 |
| 8,928,988 B1 * | 1/2015 | Ford | G02B 13/06 |
| | | | 359/664 |
| 2001/0027856 A1 * | 10/2001 | Okamoto | B64G 1/226 |
| | | | 165/96 |
| 2005/0154529 A1 * | 7/2005 | Needelman | G01C 21/025 |
| | | | 701/513 |
| 2007/0040907 A1 * | 2/2007 | Kern | A61B 5/0059 |
| | | | 348/77 |
| 2007/0115545 A1 * | 5/2007 | Chen | G02B 23/16 |
| | | | 359/429 |
| 2008/0174863 A1 * | 7/2008 | Whorton | G02B 23/16 |
| | | | 359/430 |
| 2010/0078483 A1 * | 4/2010 | Liu | G06K 7/10732 |
| | | | 235/462.42 |
| 2010/0327151 A1 * | 12/2010 | Blayvas | G01J 3/02 |
| | | | 250/226 |
| 2011/0007167 A1 * | 1/2011 | Katake | B64G 1/361 |
| | | | 348/172 |
| 2011/0032409 A1 * | 2/2011 | Rossi | G02B 5/005 |
| | | | 348/340 |
| 2011/0176214 A1 * | 7/2011 | Eiane | F41G 7/226 |
| | | | 359/601 |
| 2011/0211106 A1 * | 9/2011 | Marks | G02B 13/06 |
| | | | 348/340 |
| 2012/0275023 A1 * | 11/2012 | Weber | G02B 5/305 |
| | | | 359/485.03 |
| 2013/0110440 A1 | 5/2013 | Burkland | 702/104 |
| 2014/0267641 A1 | 9/2014 | Laine et al. | 348/61 |
| 2014/0267755 A1 | 9/2014 | Laine et al. | 348/162 |
| 2014/0300806 A1 * | 10/2014 | Pollock | H04N 5/2254 |
| | | | 348/373 |
| 2014/0340522 A1 | 11/2014 | Dawson et al. | 348/169 |
| 2015/0075426 A1 * | 3/2015 | Lin | C23C 14/28 |
| | | | 118/713 |
| 2015/0109501 A1 * | 4/2015 | Sekine | H01L 27/1464 |
| | | | 348/294 |
| 2015/0124103 A1 | 5/2015 | Dawson et al. | H04N 5/2259 |
| 2015/0346463 A1 * | 12/2015 | Fussy | G02B 13/06 |
| | | | 348/14.08 |
| 2015/0369607 A1 * | 12/2015 | Jirapong | G01C 25/00 |
| | | | 701/4 |
| 2016/0097727 A1 * | 4/2016 | Vazhaeparambil | |
| | | | G01N 21/8851 |
| | | | 382/145 |
| 2016/0121637 A1 * | 5/2016 | Chiang | B42B 5/12 |
| | | | 412/39 |
| 2016/0172393 A1 * | 6/2016 | Kim | H01L 27/14603 |
| | | | 348/308 |
| 2016/0187211 A1 * | 6/2016 | Jiang | G01L 3/08 |
| | | | 73/862.324 |

FOREIGN PATENT DOCUMENTS

| | | | | |
|---|---|---|---|---|
| JP | 2005-325596 A | | 11/2005 | ............. E04H 3/10 |
| WO | WO 2006/113938 A1 | | 10/2006 | ............ G02B 23/16 |
| WO | WO 2014/074202 A2 | | 5/2014 | ............ H04N 5/225 |

OTHER PUBLICATIONS

Pompea, et al., "Black Surfaces for Optical Systems," Handbook of Optics, http://citeseerx.ist.psu.edu/viewdoc/download?doi=10.1.1.382.8166&rep=rep1&type=pdf#page=1360, vol. II, Part 4, Ch. 37, 89 pages, 1994.

Cheng, et al., "Wide field-of-view imaging spectrometer using imaging fiber bundles," Applied Optics, vol. 50, No. 35, Dec. 10, 2011, pp. 6446-6451.

Fest, "Baffle and Cold Shield Design," Stray Light Analysis and Control, SPIE Press, IBSN 9780819493255, 2013, pp. 163-182.

Gupta, et al., "Compressive Sensing with Local Geometric Features," MIT, Mar. 23, 2011, 18 pages.

Hahn, et al., "Fiber optic bundle array wide field-of-view optical receiver for free space optical communications," Optics Letters, vol. 35, No. 21, Nov. 1, 2010, pp. 3559-3561.

International Searching Authority, International Search Report—International Application No. PCT/US2014/033985, dated Aug. 26, 2014, together with the Written Opinion of the International Searching Authority, 24 pages.

ITE Inc., SHAD (Stellar Horizon Atmospheric Dispersion), ITE Inc. SHAD Overview, http://www.iteinc.net/instrument/shad.html, Mar. 28, 2013, 1 page.

Marks, et al., "Engineering a gigapixel monocentric multiscale camera," Optical Engineering, vol. 51, No. 8, 083202, Aug. 2012, 14 pages.

NASA, "Stellar Horizon Atmospheric Dispersion Experiment," NASA-NSSDC-Experiment-Details, http://nssdc.gsfc.nasa.gov/nmc/experimentDisplay.do?id=AFP, Mar. 28, 2013, 1 page.

Samaan, et al., "Predictive Centroiding for Single and Multiple FOVs Star Trackers," Texas A&M University, 2002, 13 pages.

SCHOTT North America, Inc., Healthcare: Fiber Bundles, SCHOTT North America, Inc., http://www.us.schott.com/lightingimaging/english/products/healthcare/medicalillumination/, Apr. 9, 2013, 1 page.

Shectman, GMACS—The GMT Wide-Field Optical Spectrograph, Jul. 8, 2006, 34 pages.

Seals, et al., "Advanced infrared optically black baffle materials," SPIE, vol. 1330, Optical Surfaces Resistant to Severe Environments, 1990, pp. 164-177.

SnapLook Parsed Document, "AWARE2 Multiscale Gigapixel Camera," Duke University, Jun. 29, 2012, 5 pages.

Son, et al., "A Multiscale, Wide Field, Gigapixel Camera," Imaging and Applied Optics Technical Digest, 2011, 3 pages.

Stamenov, et al., "Optimization of two-glass monocentric lenses for compact panoramic imagers: general aberration analysis and specific designs," Applied Optics, vol. 51, No. 31, Nov. 1, 2012, pp. 7648-7661.

(56) References Cited

OTHER PUBLICATIONS

Tappe, "Development of Star Tracker System for Accurate Estimation of Spacecraft Attitude," Naval Postgraduate School Thesis, Dec. 2009, 108 pages.
Tomkins, "Get your hands on gigapixel goodness: Duke University's ultra high-res camera project hits Kickstarter," Imaging Resource, May 22, 2013, 8 pages.
White, et al., "Satellite Autonomous Navigation with SHAD," The Charles Stark Draper Laboratory, Inc., Apr. 1987, 119 pages.
White, et al., "Compression and progressive transmission of astronomical images," Proc. SPIE2199, Advanced Technology Optical Telescopes V, 703, Jun. 1, 1994, 11 pages.
Wikipedia, Smart Glass, Wikipedia, http://en.wikipedia.org/w/index.php?title=Smart_glass&oldid=553916596, May 7, 2013, 8 pages.
Willhite, "An Analysis of ICBM Navigation Using Optical Observations of Existing Space Objects," Masters Thesis, MIT Libraries, Jun. 2004, 123 pages.

\* cited by examiner

HEMISPHERICAL STAR CAMERA

TECHNICAL FIELD

The present invention relates to digital cameras and, more particularly, to digital cameras used for navigation.

BACKGROUND ART

Most artificial satellites, spacecraft and other craft, such as aircraft, ships, and ground vehicles (manned or unmanned and collectively referred to herein as vehicles), require information about their locations and/or attitudes to accomplish their missions. This information may be obtained from one or more sources, such as a global positioning system (GPS), ground-based radar tracking stations and/or an on-board star tracker or other image-based tracker (collectively referred to herein as image-based trackers).

Some image-based trackers are optical devices that measure bearing(s) to one or more stars, as viewed from a vehicle. A star tracker typically includes a star catalog that lists bright navigational stars and information about their locations in the sky, sufficient to calculate a location of a vehicle in space, given bearings to one or more of the stars. A conventional star tracker includes a lens that projects an image of a star onto a photocell, or that projects an image of one or more stars onto a light-sensitive sensor array (digital camera).

Other image-based trackers store images expected to be seen along a track, such as downward-viewed images of terrain expected to pass under a vehicle, as the vehicle travels along the track. In some cases, the expected images include images of a target location, such as an expected view from the front of the vehicle, as the vehicle approaches the target location. The vehicle includes downward and/or forward looking digital cameras and repeatedly compares views from these cameras to the stored images. Based on these comparisons, a navigation system automatically estimates a location of the vehicle and/or a course correction for the vehicle. This information is then provided to a propulsion system or control surfaces of the vehicle to alter the vehicle's direction of travel.

Some image-based trackers include monocentric lenses coupled via optical fiber bundles to a plurality of image sensor arrays. However, such digital cameras are heavy and require very precise alignment of the optical fibers. Stray light in an image-based tracker can increase noise and cause other problems.

SUMMARY OF EMBODIMENTS

An embodiment of the present invention provides a digital camera. The digital camera includes a monocentric lens, a plurality of pixelated optical sensor arrays and a plurality of baffles. The monocentric lens has a focal length, an outer surface and a center. Each pixelated optical sensor array is oriented toward the center of the monocentric lens. Each pixelated optical sensor array is paced apart from the outer surface of the monocentric lens. The pixelated optical sensor array is disposed about the focal length of the monocentric lens from the center of the monocentric lens.

For each pixelated optical sensor array of the plurality of pixelated optical sensor arrays, at least one baffle is disposed between the outer surface of the monocentric lens and the pixelated optical sensor array. The baffle corresponds to the pixelated optical sensor array. The baffle has a longitudinal axis normal to the baffle's corresponding pixelated optical sensor array. The baffle's longitudinal axis extends through the center of the monocentric lens.

Optionally, a portion, less than all, of the outer surface of the monocentric lens includes a mask that defines a plurality of transparent apertures through the mask. The mask is otherwise opaque at a predetermined wavelength. Each aperture of the plurality of apertures is aligned with the respective baffle of the at least one baffle. Each aperture limits an amount of light that can pass from the monocentric lens to the corresponding pixelated optical sensor array.

The monocentric lens may have no central aperture.

Each baffle of the at least one baffle may include a tube. Each baffle of the at least one baffle may be frustoconical.

A wall of each baffle may be opaque at a predetermined wavelength.

A wall of each baffle may have a total hemispherical reflectivity of less than about 25% at predetermined wavelength.

Each baffle may be spaced apart from the outer surface of the monocentric lens by at least about 1 mm. Each baffle may be spaced apart from the baffle's corresponding pixelated optical sensor array by at least about 1 mm.

One end of each baffle may be in contact with the outer surface of the monocentric lens. One end of each baffle may be in contact with the baffle's corresponding pixelated optical sensor array.

Each pixelated optical sensor array of the plurality of pixelated optical sensor arrays may be planar. Each pixelated optical sensor array of the plurality of pixelated optical sensor arrays may be curved. Each pixelated optical sensor array of the plurality of pixelated optical sensor arrays may be substantially parallel to the outer surface of the monocentric lens.

The digital camera may also include an object catalog that stores information about objects expected to be viewed by the digital camera. The digital camera may also include a navigation controller. The navigation controller may be communicatively coupled to the object catalog and to the plurality of pixelated optical sensor arrays. The navigation controller may use at least some of the information stored in the object catalog and image data from at least one pixelated optical sensor array of the plurality of pixelated optical sensor arrays to automatically determine a location of the digital camera and/or an orientation of the digital camera.

The digital camera may also include an object catalog that stores information about objects expected to be viewed by the digital camera. The digital camera may also include a navigation controller. The navigation controller may be communicatively coupled to the object catalog and to the plurality of pixelated optical sensor arrays. The navigation controller may use at least some of the information stored in the object catalog and image data from at least one pixelated optical sensor array of the plurality of pixelated optical sensor arrays to automatically generate course correction information.

Another embodiment of the present invention provides a digital camera. The digital camera includes a monocentric lens, a plurality of pixelated optical sensor arrays and a mask. The monocentric lens has a focal length, an outer surface and a center. Each pixelated optical sensor array is oriented toward the center of the monocentric lens. Each pixelated optical sensor array is spaced apart from the outer surface of the monocentric lens. The pixelated optical sensor array is disposed about the focal length of the monocentric lens from the center of the monocentric lens. The mask is disposed between the monocentric lens and the plurality of pixelated optical sensor arrays. The mask defines a separate aperture corresponding to each pixelated optical sensor array of the plurality of pixelated optical sensor arrays. The mask is otherwise opaque at a predetermined wavelength. Each aperture is centered on a respective line normal to the aperture's corresponding pixelated optical sensor array. Each such line extends through the center of the monocentric lens. Each aperture limits an amount of light that can pass from the monocentric lens to the aperture's corresponding pixelated optical sensor array.

The mask may be disposed on the outer surface of the lens.

The digital camera may also include a separate baffle for, and corresponding to, each pixelated optical sensor array of the plurality of pixelated optical sensor arrays. Each such baffle may be disposed between the outer surface of the monocentric lens and its corresponding pixelated optical sensor array. Each such baffle has a longitudinal axis normal to the baffle's corresponding pixelated optical sensor array. Each such longitudinal axis extends through the center of the monocentric lens.

The monocentric lens may have no central aperture.

Each baffle of the at least one baffle may include a tube. Each baffle of the at least one baffle may be frustoconical.

A wall of each baffle may be opaque at a predetermined wavelength.

A wall of each baffle may have a total hemispherical reflectivity of less than about 25% at predetermined wavelength.

Each baffle may be spaced apart from the outer surface of the monocentric lens by at least about 1 mm. Each baffle may be spaced apart from the baffle's corresponding pixelated optical sensor array by at least about 1 mm.

One end of each baffle may be in contact with the outer surface of the monocentric lens. One end of each baffle may be in contact with the baffle's corresponding pixelated optical sensor array.

Each pixelated optical sensor array of the plurality of pixelated optical sensor arrays may be planar. Each pixelated optical sensor array of the plurality of pixelated optical sensor arrays may be curved. Each pixelated optical sensor array of the plurality of pixelated optical sensor arrays may be substantially parallel to the outer surface of the monocentric lens.

The digital camera may also include an object catalog that stores information about objects expected to be viewed by the digital camera. The digital camera may also include a navigation controller. The navigation controller may be communicatively coupled to the object catalog and to the plurality of pixelated optical sensor arrays. The navigation controller may use at least some of the information stored in the object catalog and image data from at least one pixelated optical sensor array of the plurality of pixelated optical sensor arrays to automatically determine a location of the digital camera and/or an orientation of the digital camera.

The digital camera may also include an object catalog that stores information about objects expected to be viewed by the digital camera. The digital camera may also include a navigation controller. The navigation controller may be communicatively coupled to the object catalog and to the plurality of pixelated optical sensor arrays. The navigation controller may use at least some of the information stored in the object catalog and image data from at least one pixelated optical sensor array of the plurality of pixelated optical sensor arrays to automatically generate course correction information.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for high signal-to-noise digital cameras with monocentric lenses that are optically coupled to image sensor arrays without optical fibers, yet do not require external baffles to reduce stray light impingement on the image sensor arrays.

Figure 1:
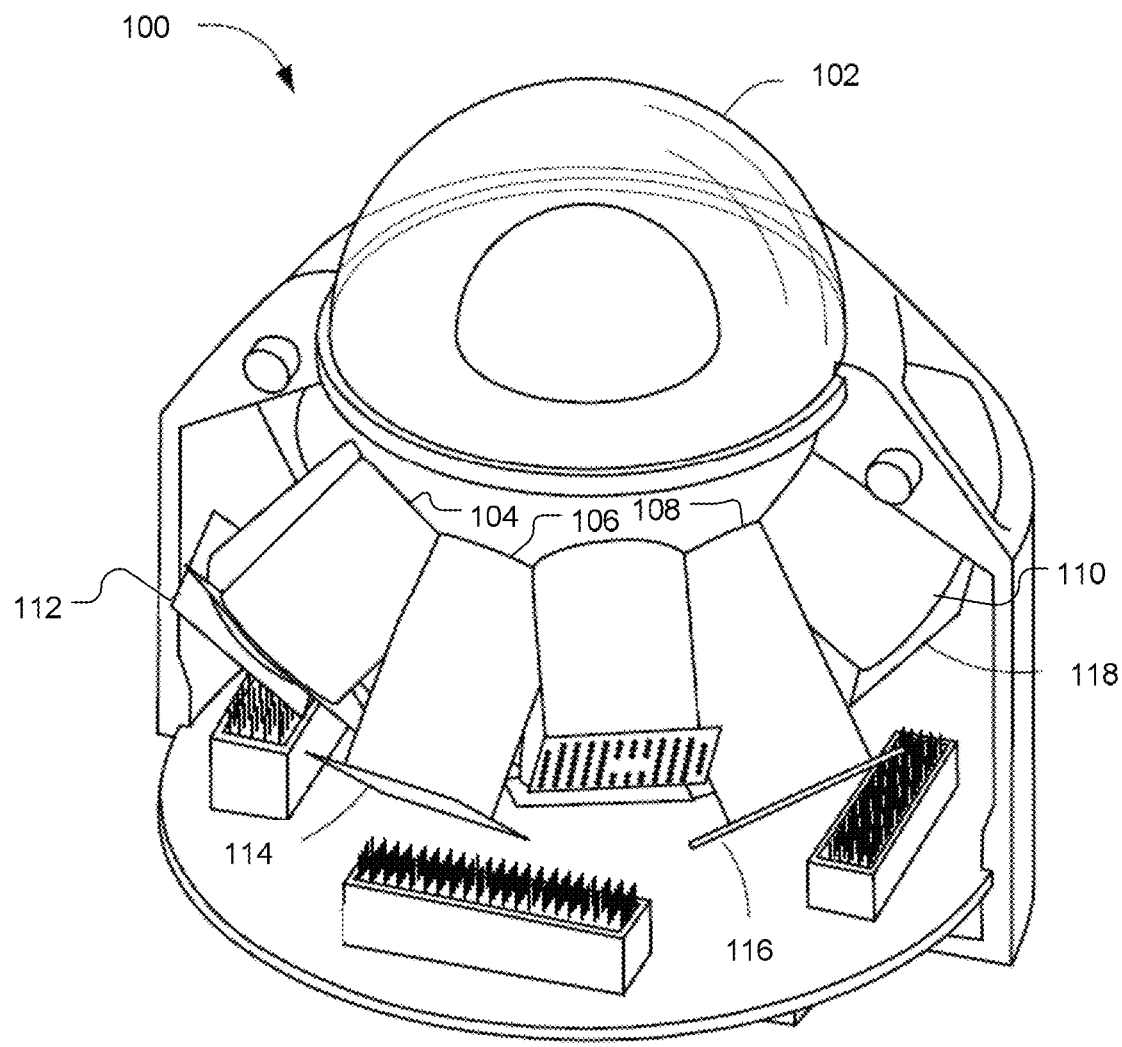
FIG. 1 is a perspective schematic view of a wide field-of-view digital camera having a spherical objective lens, according to the prior art.

Some conventional image-based trackers include wide field-of-view digital cameras. FIG. 1 is a perspective schematic view of a wide field-of-view digital camera 100 having a spherical objective lens, according to the prior art. The camera 100 has a spherical objective lens 102. The lens 102 is coupled via a plurality of optical fiber bundles, exemplified by fiber bundles 104, 106, 108 and 110, to respective square, rectangular or other shaped pixelated planar image sensor arrays, exemplified by arrays 112, 114, 116 and 118. Each optical fiber may be polished to match the spherical surface of the lens 102. The optical fibers should be subject to at most very little physical distortion (on the order of <<1%), if the image sensor pitch matches the fiber bundle pitch. Thus, each image sensor array 112-118, etc. receives light from a portion of the lens's field of view.

Figure 2:
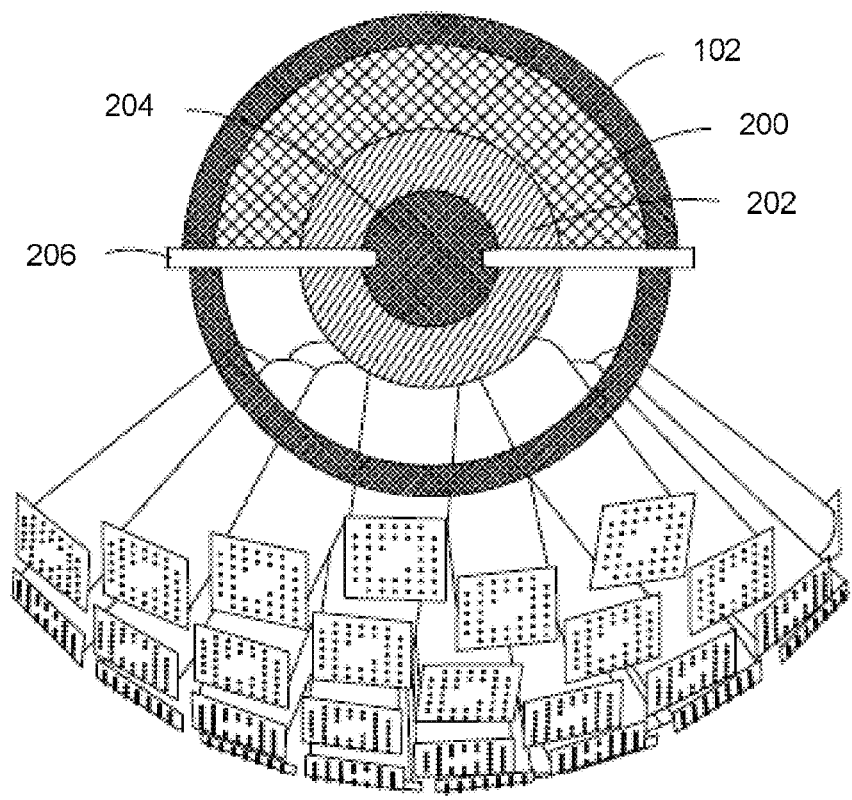
FIG. 2 is a side schematic view of the camera of FIG. 1 with more image sensor arrays, including a cross-sectional view of the spherical objective lens.

As shown schematically in FIG. 2, the lens 102 may include a plurality of monocentric shells, exemplified by shells 200 and 202, to correct for spherical and chromatic aberrations. (The camera shown in FIG. 2 includes more image sensor arrays than the camera shown in FIG. 1.) Each monocentric shell may include two domed glass shell pieces joined together so their concave surfaces face inward. The monocentric shells may all be made of the same kind glass, or different shells may be made of different kinds of glass. All the monocentric shells are concentric. Such lenses have wide fields of view and capture high-resolution images. Additionally, monocentric lenses produce less distortion than traditional fish-eye wide-angle lenses. The lens 102 may include a central aperture 204 defined by a fixed or adjustable iris 206.

Additional information about monocentric lenses is available in "Lens Design Fundamentals," by Rudolf Kingslake, Academic Press, Dec. 2, 2012, the entire contents of which are hereby incorporated by reference, for all purposes. As described by Kingslake, "A lens in which all the surfaces are concentric about a single point is called monocentric. The nodal points of such a lens are, of course, at the common center because any ray directed toward this center is undeviated. Hence the principal and nodal points also coincide at the common center. The image of a distant object is also a sphere centered about the same common center, of radius equal to the focal length. Monocentric systems can be entirely refracting or may include reflecting surfaces."

Additional information about prior art cameras is available in "Optimization of two-glass monocentric lenses for compact panoramic imagers: general aberration analysis and specific designs," by Igor Stamenov, Ilya P. Agurok and Joseph E. Ford, Applied Optics, Vol. 51, No. 31, Nov. 1, 2012, pp. 7648-7661, as well as U.S. Pat. No. 3,166,623 titled "Spherical Lens Imaging Device," by J. A. Waidelch, Jr., filed Dec. 29, 1960, the entire contents of all of which are hereby incorporated by reference herein for all purposes.

The camera 100 is conceptually similar to a larger monocentric objective camera called AWARE2 and developed at Duke University.

The ball lens 102 enables the digital camera 100 (FIG. 1) to have a very wide field of view. Typical fields of view with such lenses are 90 degrees or more, per axis. Such a wide field of view facilitates celestial sightings in many different regions of the sky, without use of gimbals or other moving parts. However, polishing and aligning the optical fibers 104-110 is time-consuming and expensive. Furthermore, spaces between the optical fiber bundles 104-110 are not imaged. On the other hand, omitting the optical fiber bundles 104-110 would introduce stray light into the optical system, which may increase noise and pose other problems.

Embodiments of the present invention optically couple monocentric lenses to image sensor arrays without optical fibers, yet shield the image sensor arrays from stray light. In some embodiments, baffles are disposed between an outer surface of a monocentric lens and each image sensor array to shield the image sensor arrays from stray light. In some embodiments, an opaque mask defines a set of apertures, one aperture per image sensor array, to limit the amount of stray light. Some embodiments include both masks and baffles.

Baffle Embodiments

Figure 3:
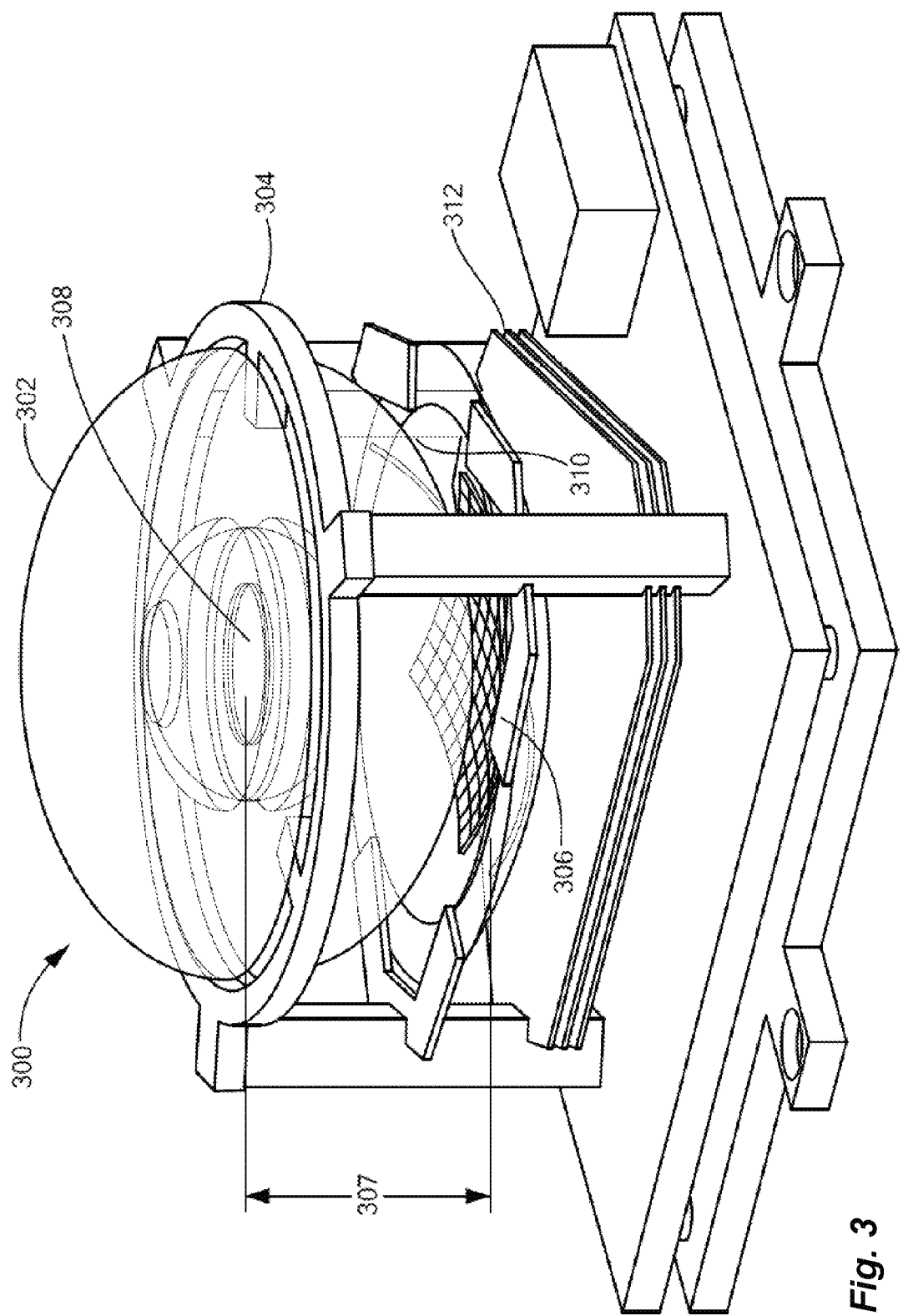
FIG. 3 is a schematic perspective illustration of a hemispherical star camera, according to an embodiment of the present invention.

FIG. 3 is a schematic perspective illustration of a hemispherical star camera 300, according to an embodiment of the present invention. A monocentric lens 302 is rigidly mounted in the camera 300, such as in a frame 304. A set of pixelated optical sensor arrays 306 is rigidly (although in some embodiments adjustably) mounted below, and oriented toward the center 308 of, the monocentric lens 302. The pixelated optical sensor arrays 306 are spaced apart from an outer surface 310 of the monocentric lens 302. The pixelated optical sensor arrays 306 are disposed in a focal surface of the monocentric lens 302. That is, each pixelated optical sensor array 306 is disposed about the focal length 307 of the monocentric lens 302 from the center 308 of the monocentric lens 302.

Figure 14:
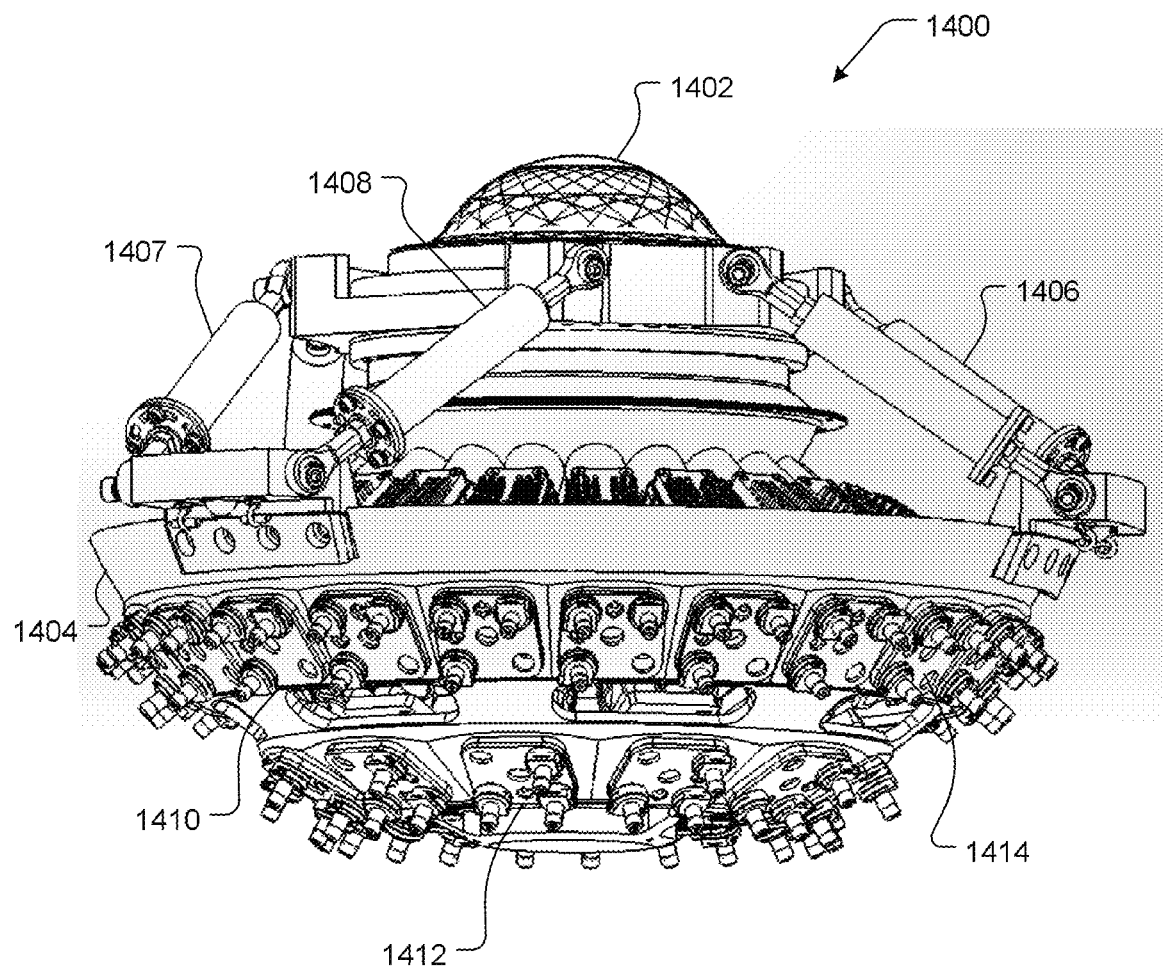
FIG. 14 is perspective side illustration of a hemispherical star camera according to an embodiment of the present invention.
Figure 15:
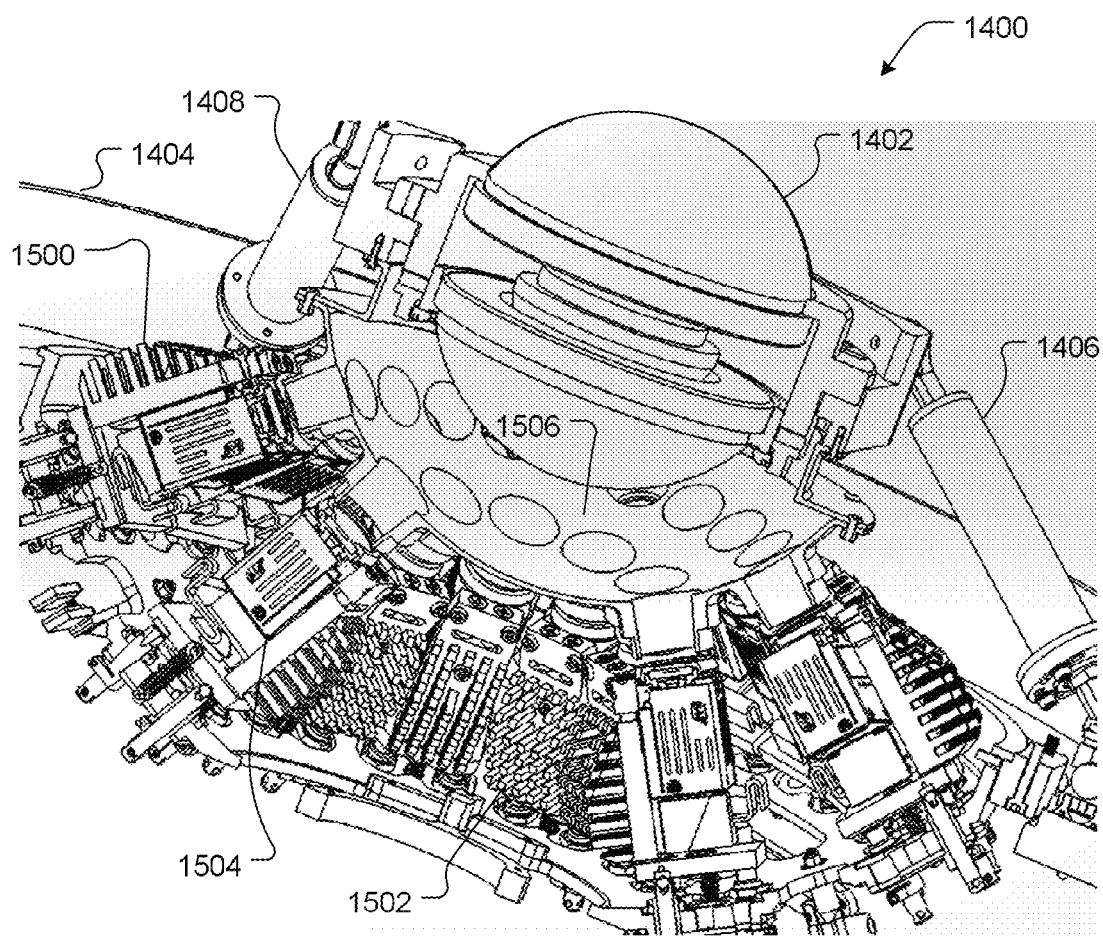
FIG. 15 a cross-sectional perspective illustration of the hemispherical star camera of FIG. 14 according to an embodiment of the present invention.

In some embodiments, each optical sensor array is adjustably mounted to a frame, so tip, tilt and focus of the optical sensor array may be independently adjusted. In some embodiments, the monocentric lens is mounted to a frame by struts that compensate for thermal expansion of other components. FIG. 14 is a perspective side illustration, and FIG. 15 is a cross-sectional perspective illustration, of a hemispherical star camera 1400, according to an embodiment of the present invention. A monocentric lens 1402 is attached to a frame 1404 by struts, exemplified by struts 1406, 1407 and 1408. A lower portion of the frame 1404 is not shown in FIG. 14 to reveal other components of the hemispherical star camera 1400.

Figure 17:
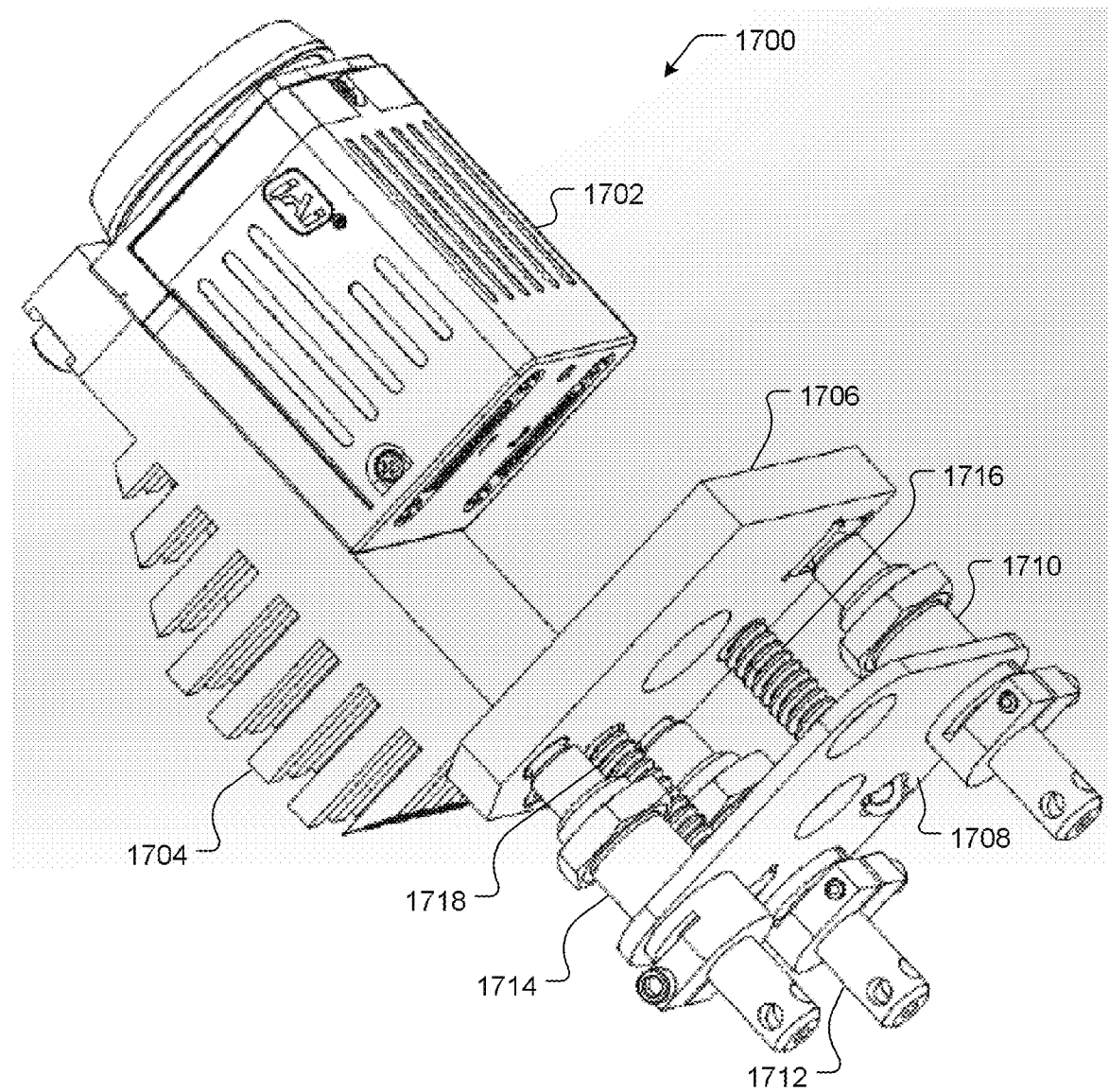
FIG. 17 is a schematic perspective illustration of a digital camera assembly according to an embodiment of the present invention.

The hemispherical star camera 1400 includes several digital camera assemblies. FIG. 17 is a perspective illustration of a representative digital camera assembly 1700. The digital camera assembly 1700 includes a digital camera 1702 and a camera mounting plate 1708. Other aspects of the digital camera assembly 1700 are described below.

In FIG. 14, only the camera mounting plates of the digital camera assemblies can be seen, exemplified by camera mounting plates 1410, 1412 and 1414. In FIG. 15, several digital camera assemblies can be seen, exemplified by digital camera assemblies 1500, 1502 and 1504. A baffle assembly 1506 that includes a set of baffles is disposed between the monocentric lens 1402 and the digital camera assemblies 1500-1504.

Figure 16:
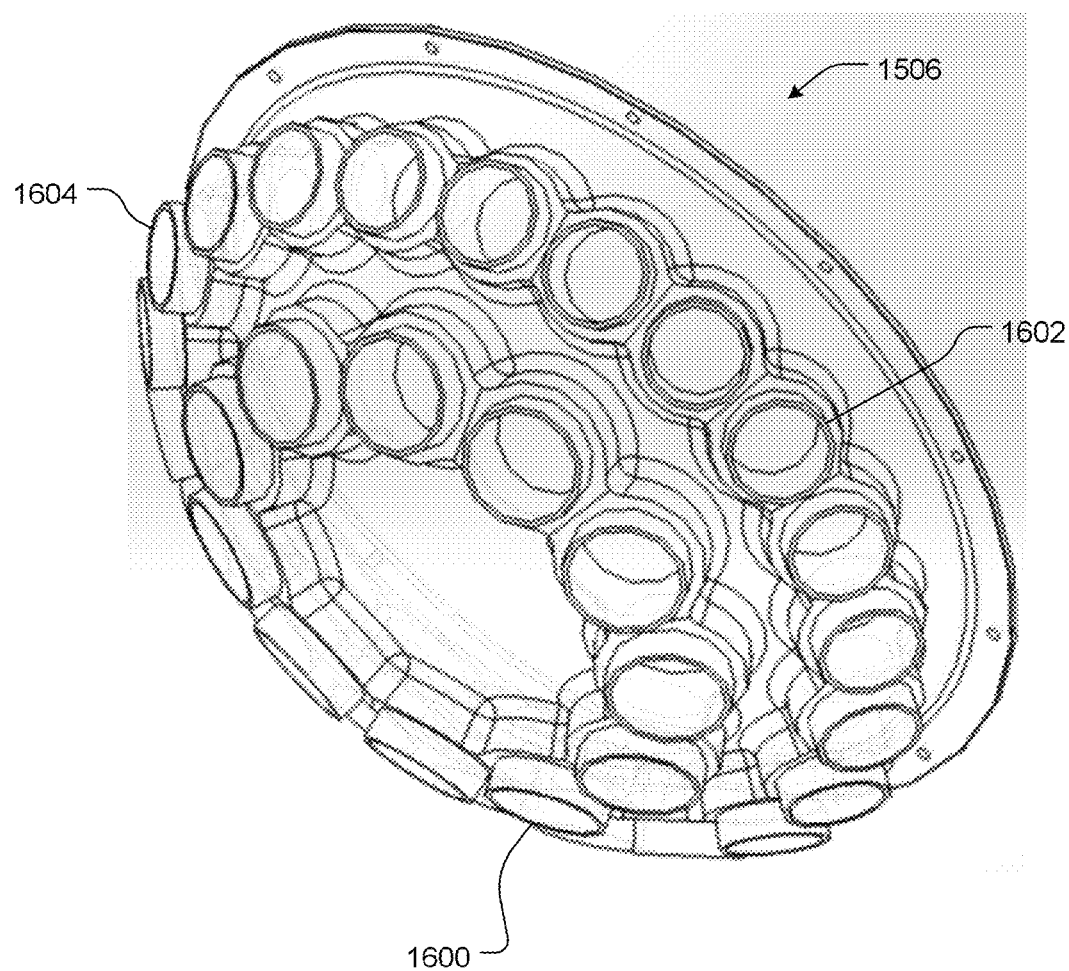
FIG. 16 is a schematic perspective illustration of a baffle assembly according to an embodiment of the present invention.

FIG. 16 is a perspective illustration of the baffle assembly 1506, although oriented differently than in FIG. 15. Several individual baffles, exemplified by baffles 1600, 1602 and 1604, can be seen in FIG. 16. The baffles 1600-1604 can be round, polygonal or any other suitable shape in cross section. The baffle assembly 1506 is made from, or coated with, a non-reflective material.

Returning to FIG. 14, the struts 1406-1408 have thermal expansion characteristics that compensate for thermal expansion of the frame 1404, digital camera assemblies 1500-1504 (FIG. 15), mounting hardware, etc. That is, the struts 1406-1408 lengthen or shorten with temperature changes, so as to maintain a relatively constant distance between the monocentric lens 1402 and image sensors in the digital camera assemblies 1500-1504.

As noted, FIG. 17 is a perspective illustration of the digital camera assembly 1700. The digital camera assembly 1700 includes a digital camera 1702, a heat sink 1704, a camera mounting stage 1706, a camera mounting plate 1708, adjusters, preferably three adjusters 1710, 1712 and 1714 and springs, preferably two springs 1716 and 1718. The camera mounting plate 1708 is directly or indirectly attached to the frame 1404 (FIG. 14). The three adjusters 1710-1714 separate the camera mounting stage 1706 from the camera mounting plate 1708, and the springs 1716 and 1718 urge the camera mounting stage 1706 toward the camera mounting plate 1708, against the adjusters 1710-1714. The adjusters 1710-1714 are length adjustable.

Collectively, the adjusters 1710-1714 change tip, tilt and focus (distance) of the digital camera 1702, relative to the monocentric lens 1402 (FIG. 14), although one, two or three of the adjusters 1710-1714 may need to be adjusted to change a single aspect (tip, tilt or focus) of the digital camera's position and/or orientation. For example, adjusting all three adjusters 1710-1714 by equal amounts and in identical directions changes the focus, without changing the tip or tilt. Adjusting all three adjusters 1710-1714 by equal amounts and in identical directions, either manually or automatically, can be used to compensate for thermal expansion of elements of the camera. Adjusting either adjuster 1710 alone, or both adjusters 1712 and 1714 by equal amounts in identical directions, changes the digital camera's tip. Adjusting adjuster either 1712 or 1714, or adjusting both of them by different amounts or in opposite directions, changes the digital camera's tilt.

Each adjuster 1710-1714 may include a manually-adjustable screw that controls the length of the adjuster. In some embodiments, each adjuster 1710-1714 is motor driven, and its motor (not shown) is controlled by a computer (not shown). The computer may analyze images from the digital camera 1702, such as for image quality, such as center, focus, contrast, modulation transfer function (MTF) or any other suitable measure, and automatically drive the motors to turn one or more of the adjusters 1710-1714, as needed, to change the tip, tilt and/or focus to improve the image quality.

The adjusters 1710-1714 may be manually or automatically adjusted to achieve a best compromise focus across an entire surface of an optical sensor array of the digital camera 1702. The adjusters 1710-1714 may be manually or automatically adjusted to compensate for movement of elements resulting from vibration of launch or the like.

Figure 13:
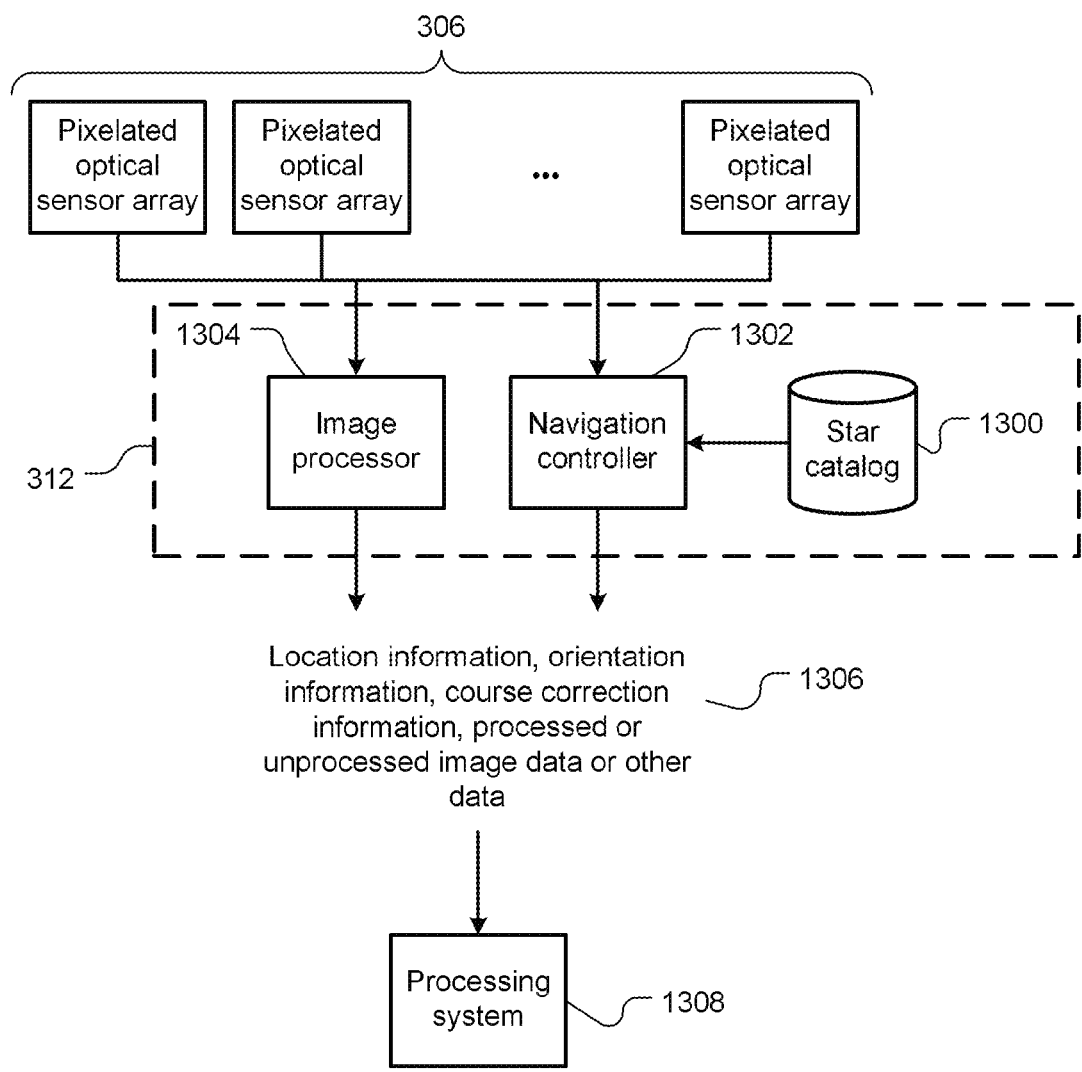
FIG. 13 is a schematic block diagram of processing electronics included in a hemispherical star camera, according to some embodiments of the present invention.

The pixelated optical sensor arrays 306 are electrically coupled to processing electronics 312. FIG. 13 is a schematic block diagram of the processing electronics 312. The processing electronics 312 may, but need not, include a star catalog 1300 or other object catalog that stores information about objects expected to be viewed by the camera 300. The processing electronics 312 may, but need not, also include a navigation controller 1302 communicatively coupled to the object catalog and to the pixelated optical sensor arrays 306.

In use, the hemispherical star camera 300 may image one or more stars, natural or artificial satellites, other relatively bright navigational objects, terrain, sea surface, target landmarks or the like. The navigation controller 1302 may use at least some of the information stored in the object catalog 1300 and image data from at least one pixelated optical sensor array of the set of pixelated optical sensor arrays 306 to automatically determine a location of the camera 300 and/or an orientation (attitude) of the camera 300, such as for an artificial satellite or other vehicle. For example, the navigation controller may compare image data from the set of pixelated optical sensor arrays 306 to expected image data stored in the object catalog 1300. The expected image data may include images or the like expected to be observed along a desired path and, optionally, images or the like expected to be observed along one or more incorrect (undesired) paths. Thus, if actual observed image data matches the desired image data, the navigation controller may conclude the camera 300 is traveling along the desired path. The processing electronics 312 may, but need not, use at least some of the information stored in the object catalog 1300 and image data from at least one pixelated optical sensor array of the set of pixelated optical sensor arrays 306 to automatically generate course correction information for a vehicle. For example, if actual observed image data does not match the desire image data, the navigation controller may conclude the camera 300 is not traveling along the desired path. A difference between actual observed image data and the desired path image data (or image data related to an incorrect path) may be used to calculate a course correction.

Optionally or alternatively, the processing electronics 312 may include image processing circuits and/or software (collectively referred to as an image processor) 1304, such as for compressing the data from the pixelated optical sensor arrays 306. Optionally or alternatively, the processing electronics 312 may send location information, orientation information, course correction information, processed or unprocessed data from the pixelated optical sensor arrays 306 or other data (collectively indicated at 1306) the processing electronics 312 derives from the data from the pixelated optical sensor arrays 306 to another system or subsystem, indicated at 1308, for processing. The other system or subsystem may be in the same vehicle as the camera 300 or it may be external to the vehicle, such as in a ground station.

As noted, in some embodiments, baffles are used to shield the pixelated optical sensor arrays 306 from stray light. Baffles are cylindrical or frustoconical shaped tubes used to enclose a light path or block zeroth-order stray light paths. Vanes are structures on baffles that block light scattered from the baffles.

"Frustum" means a cone or pyramid whose tip has been truncated by a plane parallel to its base. "Frustoconical" means having the shape of a frustum of a cone. "Frusta" is the plural form of the noun frustum.

Figure 4:
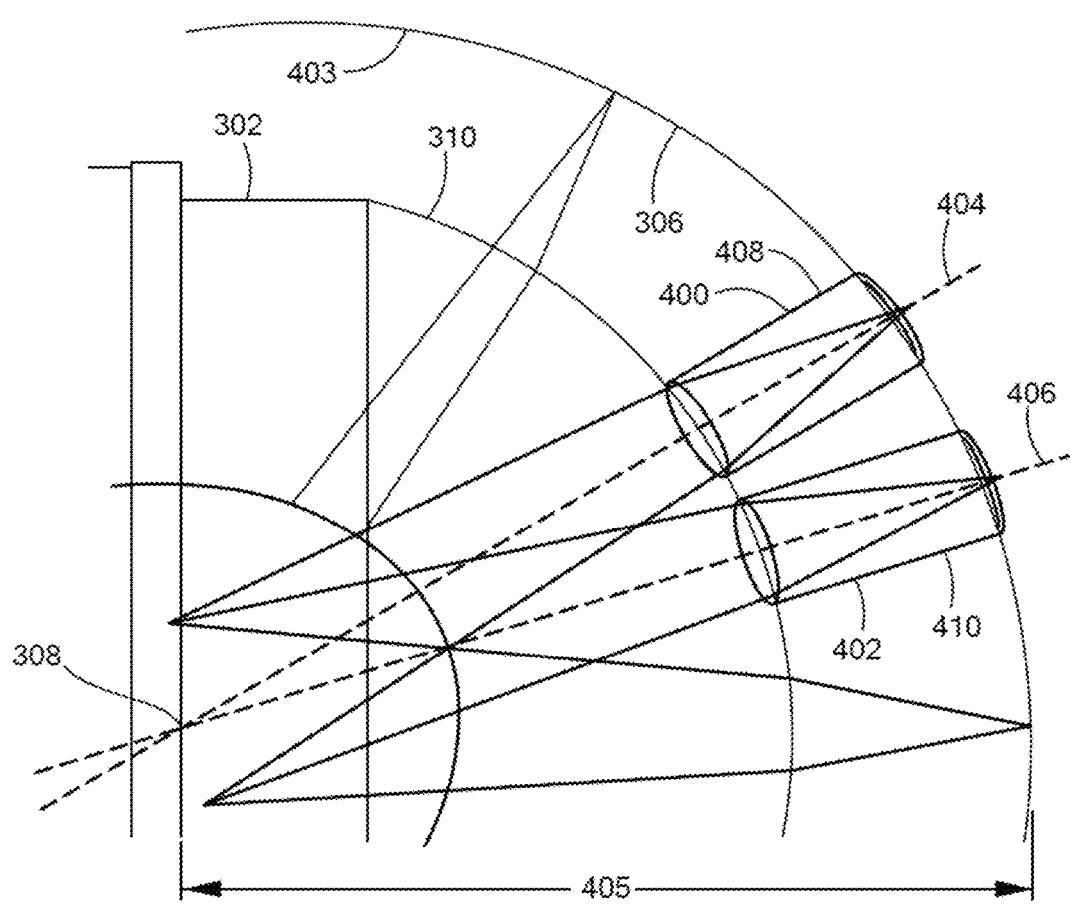
FIG. 4 is a side schematic diagram illustrating a portion of a hemispherical star camera that includes tubular baffles between, and spaced apart from, a monocentric lens and a set of pixelated optical sensor arrays, according to an embodiment of the present invention.
Figure 5:
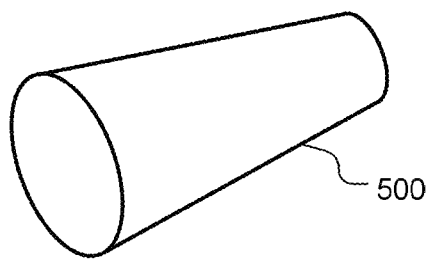
FIG. 5 is a perspective schematic diagram illustrating a frustoconical baffle of a hemispherical star camera, according to an embodiment of the present invention.

FIG. 4 is a schematic diagram illustrating an embodiment that includes tubular baffles, exemplified by tubular baffles 400 and 402. In other embodiments, the baffles are frustoconical, as exemplified in FIG. 5 at 500.

Figure 6:
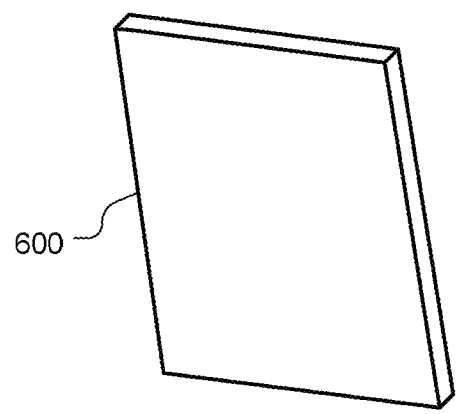
FIG. 6 is a perspective schematic illustration of a planar sensor of a hemispherical star camera, according to an embodiment of the present invention.

As shown in FIG. 4, the pixelated optical sensor arrays 306 may be curved, such as to match curvature of the focal surface 403 of the monocentric lens 302. The focal surface 403 is located the focal length 405 from the center 308 of the lens 302. In this case, the pixelated optical sensor arrays 306 should be substantially parallel to the outer surface 310 of the monocentric lens 302. Alternatively, as shown schematically in FIG. 6, each pixelated optical sensor array 600 may be planar. In this case, each pixelated optical sensor array 306 should be tangent to a line parallel to the outer surface 310 of the monocentric lens 302.

Returning to FIG. 4, for each pixelated optical sensor array of the set of pixelated optical sensor arrays 306, at least one baffle 400-402 is disposed between the outer surface 310 of the monocentric lens 302 and the pixelated optical sensor array 306. Each baffle 400-402 corresponds to the pixelated optical sensor array 306 toward which the baffle 400-402 extends. Each baffle 400-402 has a longitudinal axis, exemplified by axes 404 and 406, normal to the baffle's corresponding pixelated optical sensor array 306 and extending through the center 308 of the monocentric lens 302.

The monocentric lens 302 has no central aperture. Each baffle 400-402 defines an aperture, through which light intended to impinge on the baffle's corresponding pixelated optical sensor array passes. The aperture may be defined by one end of the baffle, the other end of the baffle, some inside circumference of the baffle intermediate the two ends of the baffle or a combination of two of more thereof.

An "entrance pupil" is an optical image of a physical aperture stop, as "seen" through the front of a lens system. The corresponding image of the aperture as seen through the back of the lens system is called an "exit pupil." The entrance pupil is usually a virtual image that lies behind the first optical surface of the optical system. The aperture defined by each baffle 400-402 creates a corresponding entrance pupil and a corresponding exit pupil.

Figure 7:
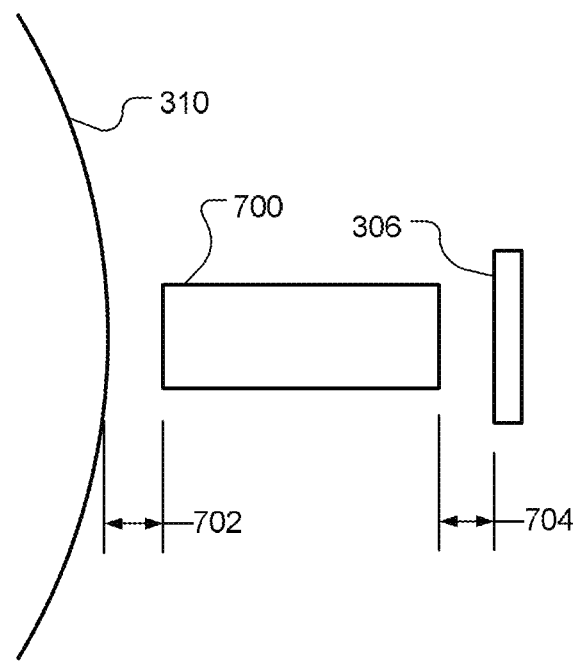
FIG. 7 is a side schematic diagram of a baffle spaced apart from an outer surface of a monocentric lens and from a pixelated optical sensor array of a hemispherical star camera, according to an embodiment of the present invention.

In the embodiment shown in FIG. 4, the baffles 400-402 extend from the outer surface 310 of the monocentric lens 302 to the pixelated optical sensor arrays 306. That is, each baffle 400-402 is in contact with the outer surface 310 of the monocentric lens 302, and each baffle 400-402 is in contact with the baffle's corresponding pixelated optical sensor array 306. However, in other embodiments, as schematically illustrated in FIG. 7, one or both ends of each baffle 700 may be spaced apart from the outer surface 310 of the monocentric lens 302 and/or the pixelated optical sensor array 306 a distance 702 and/or 704, respectively, such as by about 1 mm.

Returning again to FIG. 4, to shield the pixelated optical sensor arrays 306 from stray light, a wall, exemplified by walls 408 and 410, of each baffle 400-402 should be opaque, at least at a predetermined wavelength of interest, such as visible light, ultraviolet light, near infrared or far infrared light. As used herein, opaque means having opacity of at least about 90%. In addition, the walls 408-410 of the baffles should have a total hemispherical reflectivity of less than about 25% at a predetermined wavelength of interest, such as visible light, ultraviolet light, near infrared or far infrared light. The baffles 400-402 may be made of any suitable material.

Additional information about stray light management may be found in "Stray Light Analysis and Control," especially Chapter 9, "Baffle and Cold Shield Design," by Eric. C. Fest, SPIE Press, 2013, the entire contents of which are incorporated herein by reference for all purposes.

Mask Embodiments

Figure 8:
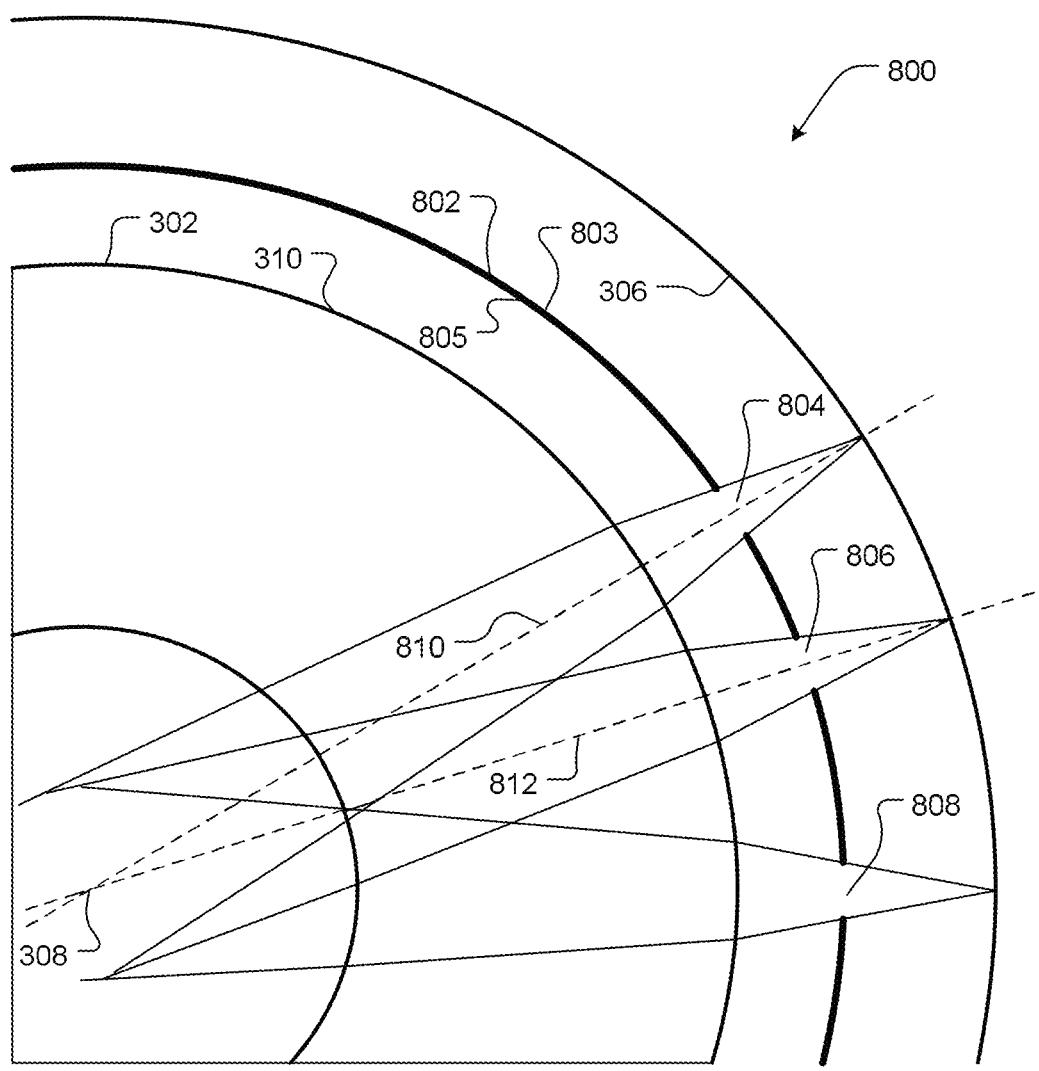
FIG. 8 is a side schematic diagram illustrating a portion of a hemispherical star camera that includes a mask disposed between an outer surface of a monocentric lens and a set of pixelated optical sensor arrays, according to an embodiment of the present invention.

As noted, in some embodiments, an opaque mask defines a set of apertures, one aperture per image sensor array. A portion 800 of a hemispherical star camera that includes such a mask 802 is schematically illustrated in FIG. 8. The mask 802 may be disposed between the outer surface 310 of the monocentric lens 302 and the set of pixelated optical sensor arrays 306, as shown in FIG. 8. In an alternative hemispherical star camera 900 schematically illustrated in FIG. 9, a mask 902 is disposed on the outer surface 310 of the monocentric lens 302, or the mask 902 may be part of a portion, less than all, of the outer surface 310 of the monocentric lens 302. The mask 802 or 902 may be made of any suitable material. The mask 902 may be printed or otherwise patterned on the outer surface 310 of the monocentric lens 302. One surface 803 or 805, or preferably both surfaces 803 and 805, of the mask 802 should be non-reflective, i.e., have a total hemispherical reflectivity of less than about 25%, at least at a predetermined wavelength of interest, such as visible light, ultraviolet light, near infrared or far infrared light. Similarly, one or both surfaces of the mask 902 should be non-reflective.

Figure 9:
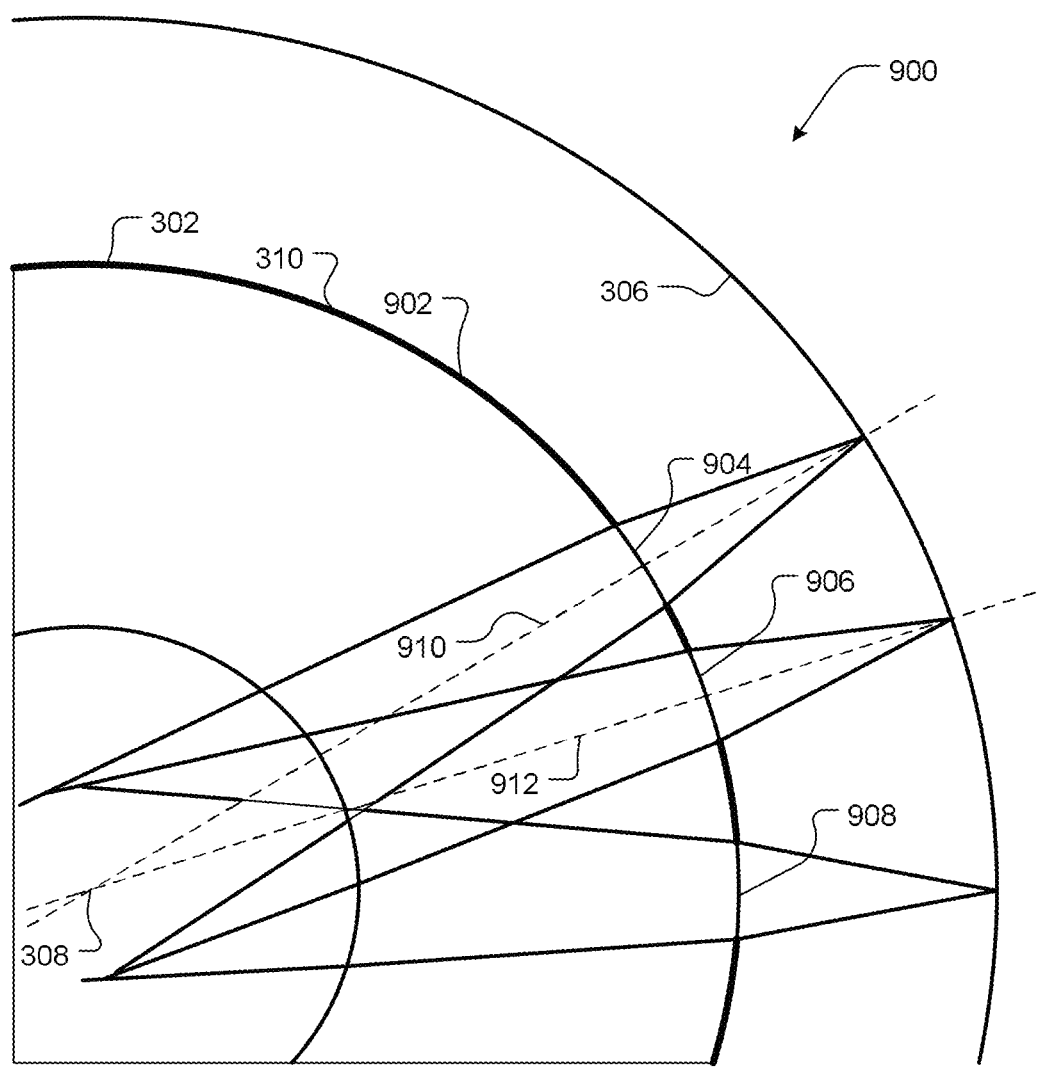
FIG. 9 is a side schematic diagram illustrating a portion of a hemispherical star camera that includes a mask disposed on an outer surface of a monocentric lens, or as part of a portion of the outer surface of the monocentric lens, according to an embodiment of the present invention.
Figure 10:
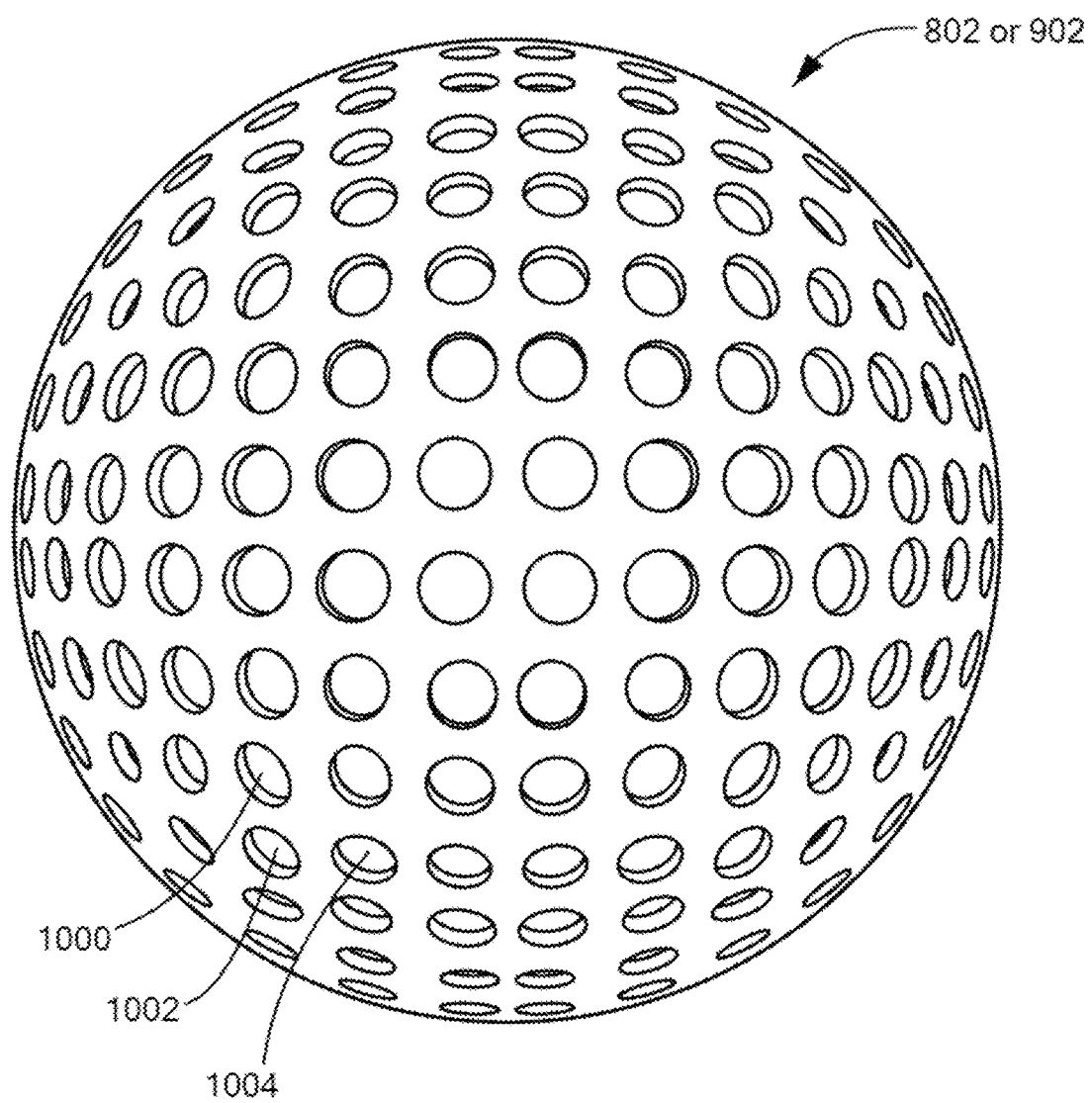
FIG. 10 is a perspective schematic diagram of a mask of FIG. 8 or 9, according to an embodiment of the present invention.

In either case, as schematically illustrated in FIG. 10, the mask 802 or 902 defines a set of transparent apertures, exemplified by apertures 1000, 1002 and 1004. The mask 802 or 902 defines a separate aperture 1000-1004 corresponding to each pixelated optical sensor array of the set of pixelated optical sensor arrays 306 (FIGS. 8 and 9). Representative apertures are shown at 804, 806 and 808 in FIG. 8, and at 904, 906 and 908 in FIG. 9. The apertures 1000-1004 may be formed in any suitable way, such as by laser drilling through an opaque material, such as ink or paint. The apertures 1000-1004 may be defined by a manufacturing process, such as photolithography. The apertures 1000-1004 may be voids or a transparent material.

Each aperture 1000-1004 is centered on a respective imaginary line normal to the aperture's corresponding pixelated optical sensor array 306 and extending through the center 308 of the monocentric lens 302. Such lines are exemplified by dashed lines 810 and 812 in FIG. 8, and dashed lines 910 and 912 in FIG. 9.

The apertures 1000-1004 permit light to travel through to the pixelated optical sensor arrays 306. Each aperture 1000-1004 limits an amount of light that can pass from the monocentric lens 302 to the aperture's corresponding pixelated optical sensor array 306. The mask 802 or 902 is otherwise opaque at a predetermined wavelength.

Figure 11:
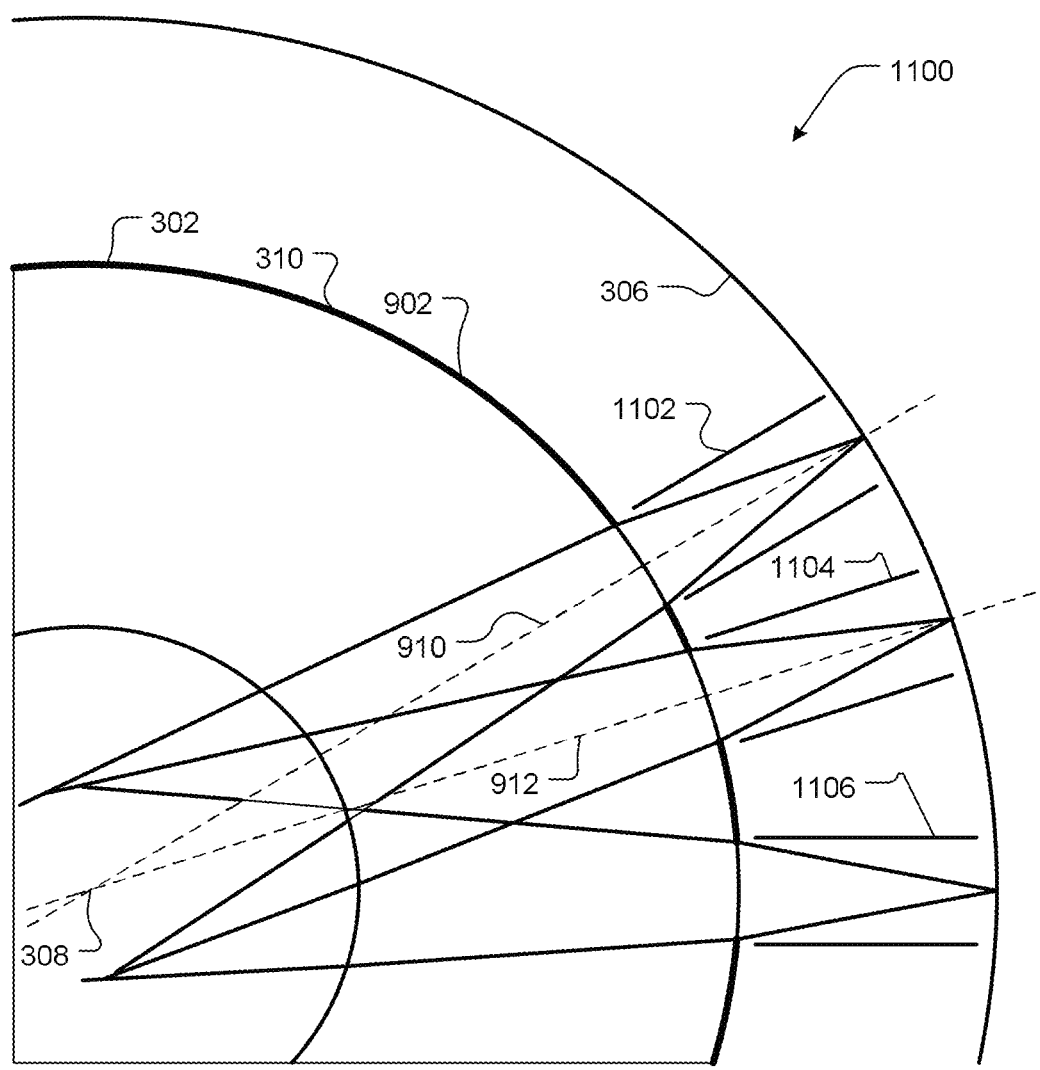
FIG. 11 is a side schematic diagram of a portion of a hemispherical star camera that includes baffles between, and spaced apart from, a monocentric lens and a set of pixelated optical sensor arrays, as well as a mask on or as part of an outer surface of a monocentric lens, according to an embodiment of the present invention.

Some embodiments include baffles and a mask. FIG. 11 schematically illustrates a portion 1100 of a hemispherical star camera that includes a mask 902 on, or as part of, the outer surface 310 of the monocentric lens 302. Baffles, exemplified by baffles 1102, 1104 and 1106, are disposed between the outer surface 310 of the monocentric lens 302 and the set of pixelated optical sensor array 306, as described with respect to FIGS. 4-7.

Figure 12:
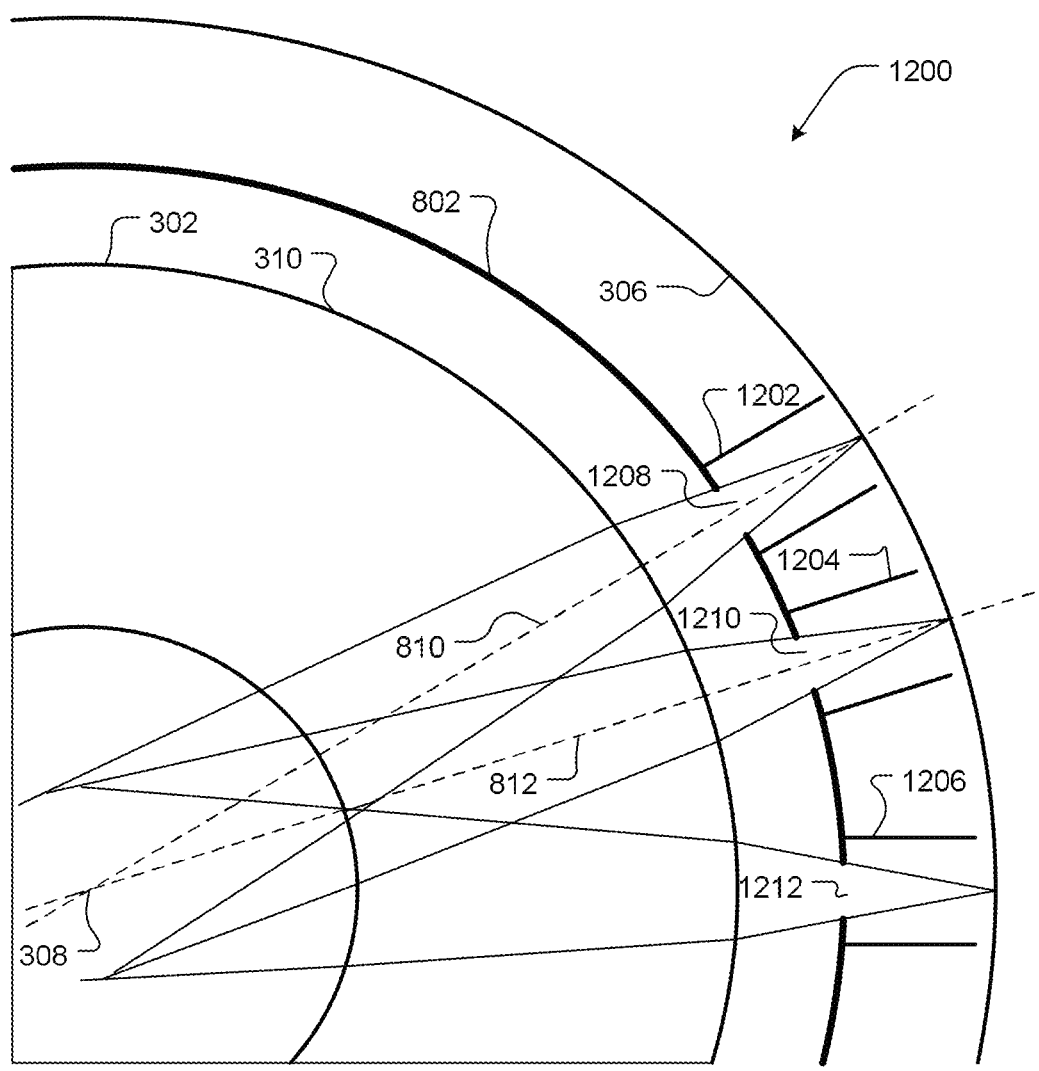
FIG. 12 is a side schematic diagram of a portion of a hemispherical star camera that includes a mask spaced apart from an outer surface of a monocentric lens, as well as baffles between the mask and a set of pixelated optical sensor arrays, according to an embodiment of the present invention.

FIG. 12 schematically illustrates a portion 1200 of a hemispherical star camera that includes a mask 802 spaced apart from the outer surface 310 of the monocentric lens 302. Baffles, exemplified by baffles 1202, 1204 and 1206, are disposed between the mask 802 and the set of pixelated optical sensor array 306, as described with respect to FIGS. 4-7. In this case, each aperture of the plurality of apertures, exemplified by apertures 1208, 1210 and 1212, is aligned with the respective baffle 1202-1206 and limits an amount of light that can pass from the monocentric lens 302 to the corresponding pixelated optical sensor array 306.

Thus, hemispherical star cameras that include baffles only, masks only and combinations of masks and baffles have been described. These and other embodiments of the present invention provide stray light rejection, without requiring optical fiber couplings between a lens and a set of pixelated optical sensor arrays, and without bulk and/or weight associated with external baffles.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof.

Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks.

What is claimed is:

1. A digital camera, comprising:
   a monocentric lens having a focal length, an outer spherical surface and a center;
   a plurality of pixelated optical sensor arrays, each pixelated optical sensor array having a plurality of pixels and being oriented toward the center of the monocentric lens and spaced apart from the outer spherical surface of the monocentric lens, such that the pixelated optical sensor array is disposed about the focal length of the monocentric lens from the center of the monocentric lens; and
   a plurality of tubular baffles, one tubular baffle of the plurality of tubular baffles for each pixelated optical sensor array of the plurality of pixelated optical sensor arrays, the baffle being disposed between the outer spherical surface of the monocentric lens and the pixelated optical sensor array, the baffle corresponding to the pixelated optical sensor array and having a longitudinal axis normal to the baffle's corresponding pixelated optical sensor array and extending through the center of the monocentric lens, the baffle enclosing a light path volume through which light passes optically unaltered while blocking zeroth-order stray light paths, and, the baffle being disposed such that only light that enters and exits the monocentric lens via the outer spherical surface, without internally reflecting off any planar surface of the monocentric lens, enters the baffle.

2. A digital camera according to claim 1, wherein a portion, less than all, of the outer spherical surface of the monocentric lens comprises a mask that defines a plurality of transparent apertures therethrough and is otherwise opaque at a predetermined wavelength, such that each aperture of the plurality of apertures is aligned with a respective baffle of the plurality of tubular baffles and limits an amount of light that can pass from the monocentric lens to the corresponding pixelated optical sensor array, wherein the mask is shaped as at least a portion of a spherical surface.

3. A digital camera according to claim 1, wherein the monocentric lens has no central aperture.

4. A digital camera according to claim 1, wherein each baffle is cylindrical.

5. A digital camera according to claim 1, wherein each baffle is frustoconical.

6. A digital camera according to claim 1, wherein a wall of at least one baffle is opaque at a predetermined wavelength.

7. A digital camera according to claim 1, wherein a wall of at least one baffle has a total hemispherical reflectivity of less than about 25% at predetermined wavelength.

8. A digital camera according to claim 1, wherein at least one baffle is spaced apart from the outer spherical surface of the monocentric lens by at least about 1 mm.

9. A digital camera according to claim 1, wherein one end of at least one baffle is in contact with the outer spherical surface of the monocentric lens.

10. A digital camera according to claim 1, wherein at least one baffle is spaced apart from the baffle's corresponding pixelated optical sensor array by at least about 1 mm.

11. A digital camera according to claim 1, wherein one end of at least one baffle is in contact with the baffle's corresponding pixelated optical sensor array.

12. A digital camera according to claim 1, wherein at least one pixelated optical sensor array of the plurality of pixelated optical sensor arrays is planar.

13. A digital camera according to claim 1, wherein at least one pixelated optical sensor array of the plurality of pixelated optical sensor arrays is curved.

14. A digital camera according to claim 1, wherein at least one pixelated optical sensor array of the plurality of pixelated optical sensor arrays is substantially parallel to the outer spherical surface of the monocentric lens.

15. A digital camera according to claim 1, further comprising:
   an object catalog storing information about objects expected to be viewed by the digital camera; and
   a navigation controller communicatively coupled to the object catalog and to the plurality of pixelated optical sensor arrays, wherein the navigation controller uses at least some of the information stored in the object catalog and image data from at least one pixelated optical sensor array of the plurality of pixelated optical sensor arrays to automatically determine at least one of: a location of the digital camera and an orientation of the digital camera.

16. A digital camera according to claim 1, further comprising:
   an object catalog storing information about objects expected to be viewed by the digital camera; and
   a navigation controller communicatively coupled to the object catalog and to the plurality of pixelated optical sensor arrays, wherein the navigation controller uses at least some of the information stored in the object catalog and image data from at least one pixelated optical sensor array of the plurality of pixelated optical sensor arrays to automatically generate course correction information.

\* \* \* \* \*